United States Patent
Faber

[11] Patent Number: 6,147,800
[45] Date of Patent: *Nov. 14, 2000

[54] FLUORESCENCE STEREO MICROSCOPE ILLUMINATOR

[75] Inventor: Lothar K. Faber, Short Hills, N.J.

[73] Assignee: Kramer Scientific Corporation, Elmsford, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/936,917

[22] Filed: Sep. 25, 1997

[51] Int. Cl.[7] .............................. G02B 21/06; G02B 21/22
[52] U.S. Cl. .......................... 359/389; 359/376; 359/385
[58] Field of Search .................................... 359/368, 381, 359/385–390, 618, 634, 639–640; 250/458.1, 461.2; 356/317, 345, 359

[56] References Cited

U.S. PATENT DOCUMENTS

| 4,407,569 | 10/1983 | Piller et al. | 359/388 |
| 4,753,525 | 6/1988 | Gaul et al. | 359/388 |
| 4,756,611 | 7/1988 | Yonekubo et al. | 359/389 |
| 5,371,624 | 12/1994 | Nagano et al. | 359/389 |
| 5,428,475 | 6/1995 | Tanaami et al. | 359/368 |
| 5,446,582 | 8/1995 | Takagi et al. | 359/385 |

FOREIGN PATENT DOCUMENTS 3327672  2/1985  Germany ............................... 359/376

Primary Examiner—Thong Nguyen
Attorney, Agent, or Firm—Sughrue, Mion, Zinn, Macpeak & Seas, PLLC

[57] ABSTRACT

A reflective light fluorescence system that functions on a stereo microscope with two distinct optical paths to illuminate samples that have been stained with a fluorochrome or that may exhibit autofluorescence. The stereo microscope includes a source of illumination and a filter module with two dichroic mirrors, for sending an excited wavelength of the illumination equally down both optical axes to excite the sample uniformly. A portion of the illumination light passes through the first dichroic mirror, which is preferably about 50% dichroic, to the second dichroic mirror, while the remaining light is reflected down one optical path of the microscope. The second dichroic mirror, which is preferably about 100% dichroic, reflects 100% of the remaining portion of the illumination light down the second optical path. Thus, the sample is uniformly excited by the illumination light reflected down both optical paths. The resulting emitted signal is transmitted from the sample up through the optical paths equally. The filter module has interchangeable pairs of barrier filters on sliders so that rapid changes in emission spectra can be accomplished. In addition, the filter module readily slides out of the microscopic path to instantly convert the present stereo microscope running the reflective light fluorescence system back into a traditional stereo microscope.

19 Claims, 4 Drawing Sheets

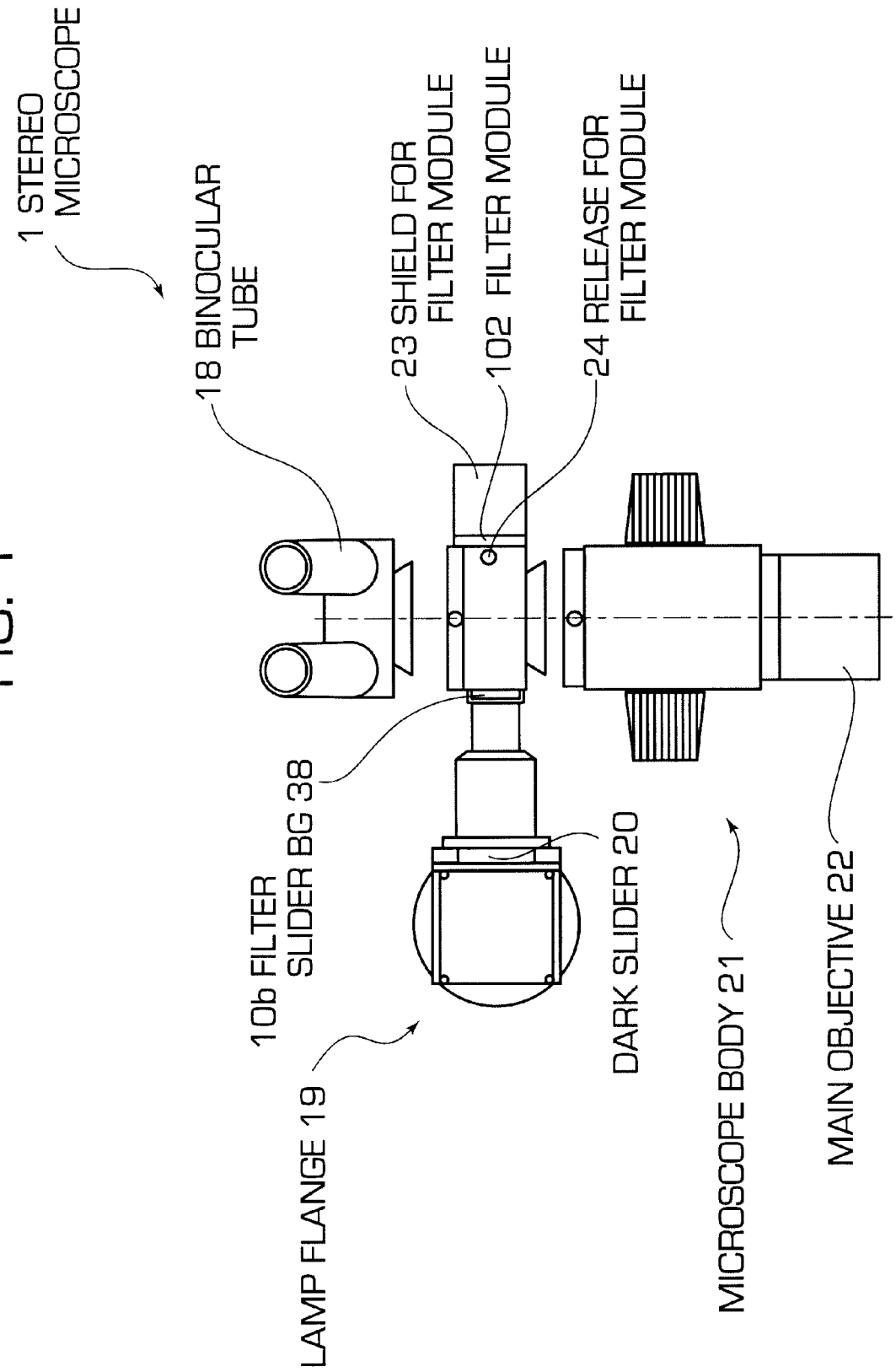

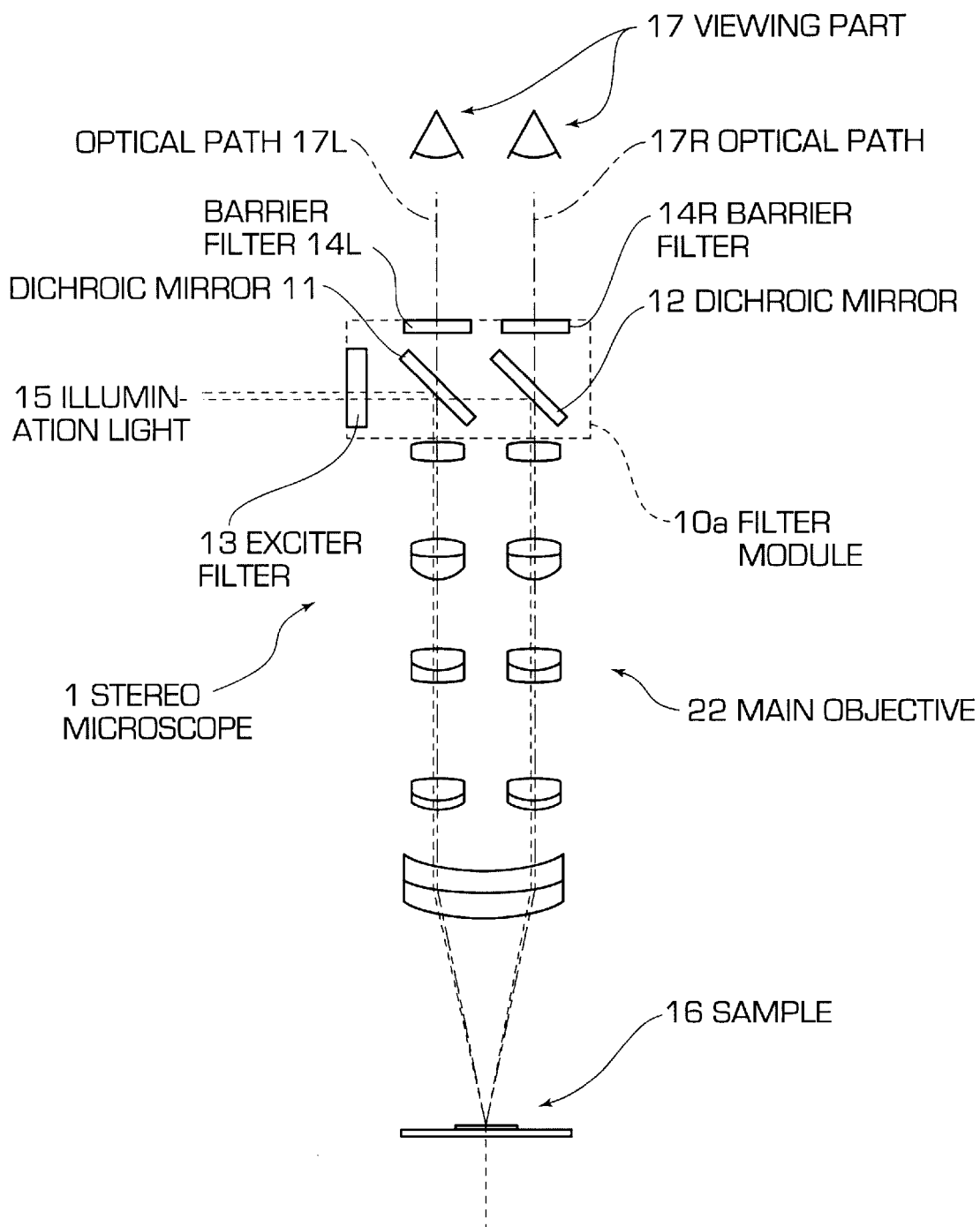

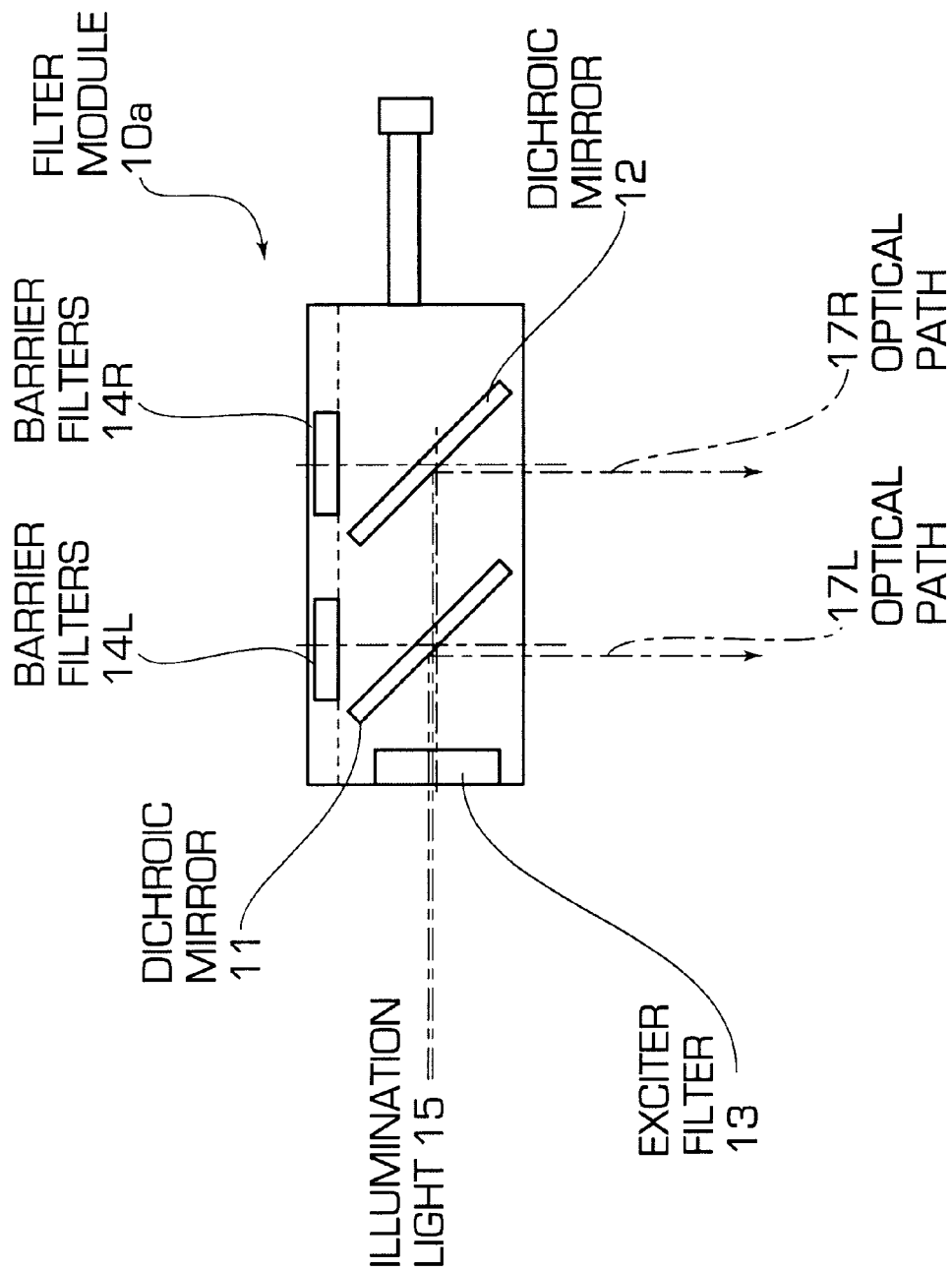

FLUORESCENCE STEREO MICROSCOPE ILLUMINATOR

BACKGROUND OF THE INVENTION

The present invention relates in general to a stereo microscope, having two distinct optical paths, for viewing samples that have either been stained with a fluorochrome or samples that may exhibit autofluorescence. More particularly, the invention is directed to a stereo microscope having a reflective light fluorescence system for sending excitation wavelength equally down both optical paths of the microscope to excite the samples uniformly.

There are known stereo microscopes for viewing samples, including samples that have been stained with a fluorochrome or that exhibit autofluorescence. In many microscopes, the sample is illuminated with the ambient light of the room. However, such microscopes do not permit effective viewing of the sample, primarily because the light illuminating the sample is insufficient.

Other microscopes are known in which light is illuminated down one of the optical paths of the microscope. While this general type of microscope provides greater illumination of the sample than earlier microscopes, the sample is not illuminated evenly. Consequently, the resulting image emitted from the sample is uneven and unbalanced to the viewer. This is a problem and disadvantage of conventional stereo microscopes.

SUMMARY OF THE INVENTION

In view of the foregoing, it is an object of the present invention to provide a stereo microscope having a reflective light fluorescence system which overcomes all of the problems and disadvantages associated with conventional microscopes and which fulfills all of the advantages sought therefor.

It is another object of the present invention to provide a stereo microscope having two optical paths and a reflective light fluorescence system that permits a human viewer to observe an even and balanced sample.

Another object of the present invention is to provide a reflective light fluorescence system for sending excitation wavelength equally down both optical axes of a stereo microscope to excite the sample uniformly.

It is a further object of the present invention to provide a reflective light fluorescence system for passing a resulting emitted signal, that is transmitted upward from the sample, equally through the same two optical paths of the stereo microscope.

It is yet a further object of the present invention to provide a filter module including interchangeable pairs of barrier filters that slide in and out of the module on sliders so that rapid changes in emission spectra can be accomplished.

It is yet a further object of the present invention to provide a filter module that can readily slide in and out of the microscopic path. This enables instant conversion of the present stereo microscope running the reflective light fluorescence system back into a traditional stereo microscope.

Accordingly, these and other objects of the present invention are achieved by: a stereo microscope including first and second optical paths, an illumination source coupled to the stereo microscope for generating illumination light and a filter module, disposed within the stereo microscope, for reflecting the illumination light down the first and second optical paths to a sample. More particularly, the filter module includes first and second dichroic mirrors, wherein the first dichroic mirror reflects a portion of the illumination light down the first optical path and passes a remaining portion of the illumination light to the second dichroic mirror. The second dichroic mirror reflects the remaining portion of the illumination light, received from the first dichroic mirror, down the second optical path. Preferably, the first dichroic mirror is about 50% dichroic and the second dichroic mirror is about 100% dichroic. The filter module further includes an exciter filter for selecting a wavelength of illumination light to excite the sample and barrier filters for passing the signal emitted upward from the sample.

The stereo microscope of the present invention also includes a binocular tube coupled to the filter module for viewing the sample, a microscopic body coupled to the filter module, and a main objective coupled to said microscopic body. A filter slider is provided for sliding the filter module in an out of a microscopic path and barrier filter sliders are provided for sliding pairs of barrier filters in and out the filter module.

A method for illuminating samples in a stereo microscope is also provided herein.

BRIEF DESCRIPTION OF THE DRAWINGS

The above objectives and advantages of the present invention will become apparent from the detailed description taken in conjunction with the accompanying drawings, in which:

FIG. 1 illustrates a stereo microscope according to the present invention;

FIG. 2A illustrates optical paths of the stereo microscope of FIG. 1;

FIG. 2B shows a filter module for use in the stereo microscope of FIG. 1; and

DESCRIPTION OF THE PREFERRED EMBODIMENTS

Figure 3:
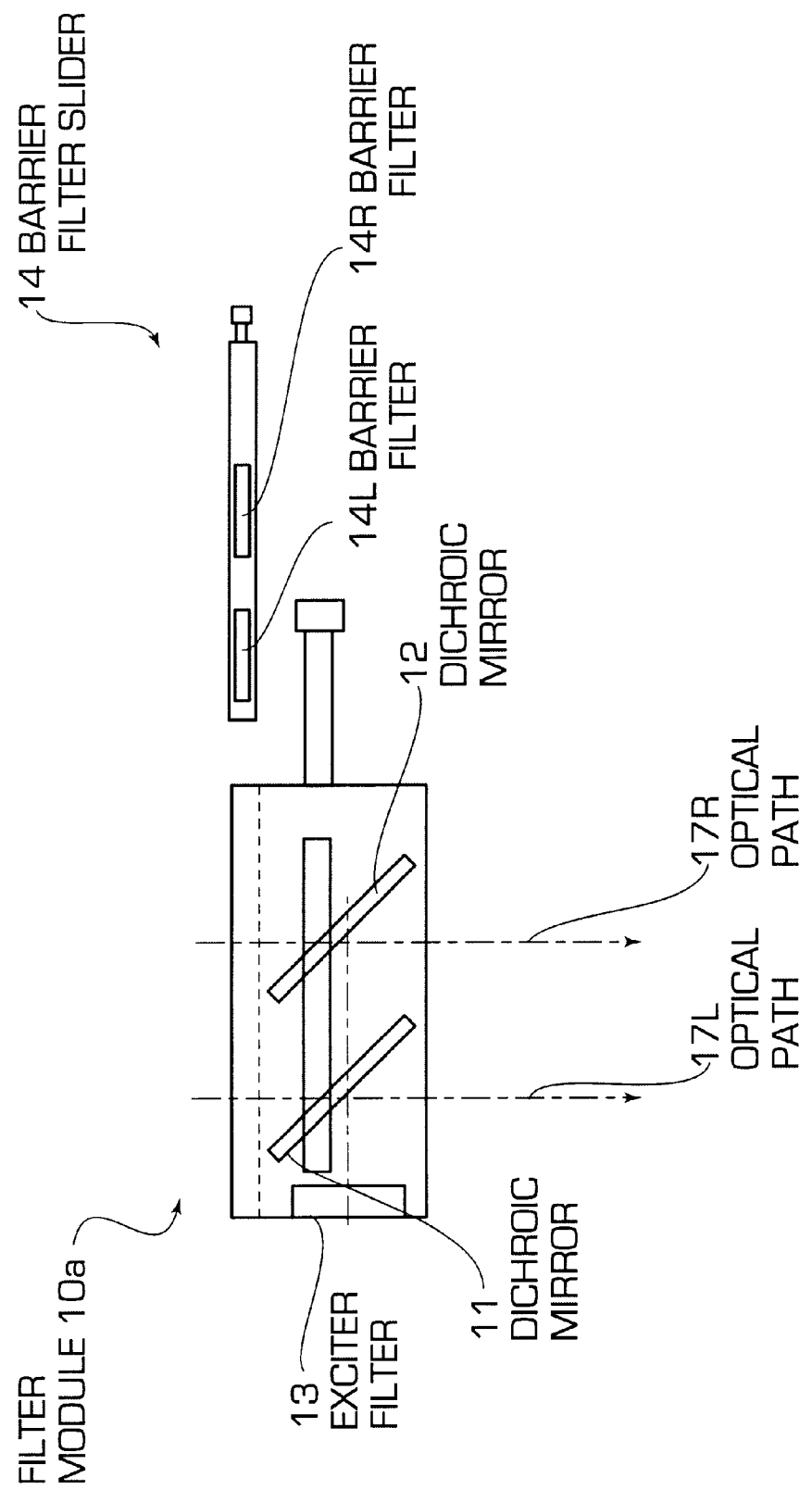
FIG. 3 illustrates the filter module of FIG. 2B according to a preferred embodiment of the present invention.

The present invention will now be described with reference to its preferred embodiments in connection with the accompanying drawings, wherein like reference characters designate like or corresponding parts throughout the views.

FIG. 1 illustrates a stereo microscope 1 having a reflective light florescence system in accordance with the present invention. The stereo microscope 1 includes binocular tube 18 for viewing a sample 16 via optical paths 17L, 17R. The microscope also includes a lamp flange 19 that generates illumination light, which is transmitted through a dark slider 20 and into a filter module 10a. The filter module 10a reflects the illumination light down through the microscopic body 21 and main objective 22, and onto the sample 16. The sample may be stained with a fluorochrome or exhibits autofluorescence, as is well known in the art. A shield 23 holds the filter module 10a in place and a release 24 is used to release the module so that it slides in and out of the stereo microscope 1 on a filter slider 10b. This enables an easy and instant conversion of the filter for use in the stereo microscope. Additionally the stereo microscope may be converted back into a traditional stereo microscope.

As shown in FIGS. 2A, 2B and 3, the filter module 10a includes a single exciter filter 13 which selects a particular wavelength of illumination light 15 for exciting the fluorochrome sample. The selected wavelength of light passes through a first dichroic mirror 11 which has a selected wavelength. The dichroic mirror 11 reflects a predetermined portion of the illumination light down the first optical path 17L of the microscope and passes the remaining portion of the illumination light to a second dichroic mirror 12, having the same selected wavelength as dichroic mirror 11. The dichroic mirror 12 reflects all or substantially all of the remaining portion of illumination light down the second optical path 17R. Thus, the sample 16 is uniformly excited by the illumination transmitted down both optical paths 17L, 17R. The resulting emitted signal is transmitted from the sample up through the optical paths 17L, 17R equally. The signal passes through the matched pair of dichroic mirrors 11, 12 and through a matched pair of barrier filters 14L, 14R onto the viewing part 17 of the stereo microscope 1.

According to a preferred embodiment of the present invention, the dichroic mirror 11 is 50% dichroic and reflects 50% of the illumination light down the first optical path 17L and passes the remaining 50% of the illumination light to the second dichroic mirror 12. The second dichroic mirror 12 is 100% dichroic and reflects 100% of the remaining portion of illumination light down the second optical path 17R.

According to another embodiment of the present invention, the first dichroic mirror 11 can be less than or greater than 50% dichroic to alter the distribution of the illumination light down the first and second optical paths. For example, the dichroic mirror 11 may be 40% dichroic and reflect 40% of the illumination light down the first optical path 17L and pass the remaining 60% of the illumination light to the second dichroic mirror 12. The second dichroic mirror 12 is 100% dichroic and reflects 100% of the remaining portion of illumination light down the second optical path 17R.

As another example, the first dichroic mirror 11 may be 55% dichroic and reflect 55% of the illumination light down the first optical path 17L and pass the remaining 45% of the illumination light to the second dichroic mirror 12. The second dichroic mirror is 100% dichroic and reflects 100% of the remaining portion of illumination light down the second optical path 17R.

As shown in FIG. 3, the filter module 10a has interchangeable pairs of barrier filters 14L, 14R on sliders 14 so that rapid changes in emission spectra can be accomplished. The barrier filter slider 14 easily slides in and out of the filter module 10a.

While the invention has been described above in detail, various changes and modifications within the scope and spirit of the invention will be apparent to those of working skill in this technological field. Thus, the invention is to be considered as limited only by the scope of the appended claims.

What is claimed is:

1. A stereo microscope comprising:

first and second optical paths;

an illumination source coupled to said stereo microscope for generating illumination light; and a filter module, disposed within said stereo microscope, for reflecting said illumination light down said first and second optical paths to a sample, said filter module comprising first and second dichroic mirrors, said first dichroic mirror being about 50% dichroic for reflecting about 50% of said illumination light down said first optical path and passing about 50% of said illumination light to said second dichoric mirror; and said second dichoric mirror being about 100% dichoric for reflecting substantially all of said illumination light received from said first dichroic mirror down said second optical path.

2. A stereo microscope as defined in claim 1, wherein said illumination source comprises a lamp flange.

3. A stereo microscope as defined in claim 1, wherein said stereo microscope further comprises:

a binocular tube coupled to said filter module for viewing said sample;

a microscopic body coupled to said filter module; and a main objective coupled to said microscopic body.

4. A stereo microscope as defined in claim 1, further comprising:

a filter slider for sliding said filter module in and out of a microscopic path of said stereo microscope.

5. A filter module for a stereo microscope having an illumination source and first and second optical paths for observing a samples said filter module comprising:

a first dichroic mirror being substantially 50% dichroic for reflecting illumination light down said first optical path and passing a signal emitted upward from a sample for viewing; and a second dichroic mirror being substantially 100% dichoric for reflecting light down said second optical path and passing a signal emitted upward from said sample for viewing, wherein said first and second dichoric mirrors provide substantially even illumination of said sample via said first and second optical paths.

6. A filter module for a stereo microscope as defined in claim 5, further comprising-an exciter filter for selecting a particular wavelength of said illumination light to excite said sample.

7. A filter module for a stereo microscope as defined in claim 5, further comprising a pair of barrier filters for passing said signal emitted upward from said sample.

8. A filter module for a stereo microscope as defined in claim 7, further comprising sliding means for sliding said pair of barrier filters in and out of said filter module.

9. A filter module for a stereo microscope as defined in claim 8, wherein said sliding means comprises a slider for receiving said pair of barrier filters.

10. A filter module for a stereo microscope as defined in claim 5, further comprising sliding means for sliding said filter module in and out of a microscopic path of the stereo microscope.

11. A filter module for a stereo microscope as defined in claim 10, wherein said sliding means comprises a filter slider.

12. A method for illuminating samples in a stereo microscope, having first and second optical paths, said method comprising the steps of:

generating an illumination light;

reflecting, with a first dichroic mirror substantially one-half of said illumination light down said first optical path of said stereo microscope;

reflecting, with a second dichroic mirror, substantially all of said illumination light not reflected down said first optical path, down said second optical path of said stereo microscope; and illuminating a sample with said illumination light reflected down said first and second optical paths, wherein illumination of said sample is evenly distributed through said first and second optical paths.

13. A method for illuminating samples in a stereo microscope as defined in claim 12, said method further comprising the step of passing a signal emitted upward from said sample equally through said first and second optical paths of said stereo microscope.

14. A stereo microscope comprising:

a body;

first and second optical paths disposed within said body;

an illumination source coupled to said body of said stereo microscope for generating illumination light; and an integral filter module comprising first and second dichroic mirrors and first and second filters, said filter module being slidable in and out of said body, such that when said filter module is out of said body said first and second optical paths provide clear optical paths for observing light transmitted from a sample, and when said filter module is in said body said first dichroic mirror reflects a first portion of said illumination light down said first optical path and passes a second portion of said illumination light to said second dichroic mirror; and said second dichroic mirror reflects said second portion of said illumination light received from said first dichroic mirror down said second optical path, and said first and second optical paths including said first and second filters enable observation of light transmitted from the sample to be viewed via said first and second filters.

15. The stereo microscope as defined in claim 14, wherein said first and second filters are barrier filters, said barrier filters passes a signal emitted from a sample for viewing.

16. A filter module for a stereo microscope as defined in claim 15, further comprising sliding means for sliding said pair of barrier filters in and out of said filter module.

17. A filter module for a stereo microscope as defined in claim 16, wherein said sliding means comprises a slider for receiving said pair of barrier filters.

18. A filter module for a stereo microscope as defined in claim 14, wherein said first dichroic mirror is 50% dichroic such that each of said first and second portions is about 50% of said illumination light; and said second dichroic mirror is about 100% dichroic.

19. The stereo microscope as defined in claim 14, further comprising a slider and release assemblly couple to said body and mechanical engaging said integral filter module with said body and releasing said integral filter module to allow said filter module to be removed from said body.

* * * * *